United States Patent

Dimmick, Sr. et al.

[11] Patent Number: 5,861,554
[45] Date of Patent: Jan. 19, 1999

[54] METHOD AND APPARATUS FOR DETERMINING FILL LEVEL VOLUME OF AIR OF CONTAINERS

[75] Inventors: Henry M. Dimmick, Sr.; Thomas F. Melnik; Gary A. Schmiedecke, all of Butler, Pa.

[73] Assignee: AGR International, Inc., Butler, Pa.

[21] Appl. No.: 732,910

[22] Filed: Oct. 17, 1996

[51] Int. Cl.[6] .................................................. G01F 17/00
[52] U.S. Cl. .......................................................... 73/149
[58] Field of Search .......................... 73/149, 49.2, 290 R

[56] References Cited

U.S. PATENT DOCUMENTS

| | | | |
|---|---|---|---|
| 3,060,735 | 10/1962 | Baker | 73/149 |
| 4,872,489 | 10/1989 | Erhart | 73/149 |
| 4,888,718 | 12/1989 | Furuse | 73/149 |
| 4,899,573 | 2/1990 | Dimmick et al. | 73/149 |
| 5,367,797 | 11/1994 | Zaim | 73/49.2 |
| 5,568,262 | 10/1996 | La Chapelle et al. | 356/379 |

FOREIGN PATENT DOCUMENTS 1536209  1/1990  U.S.S.R. .................................. 73/149

*Primary Examiner*—Hezron Williams
*Assistant Examiner*—Nashmiya Fayyaz
*Attorney, Agent, or Firm*—Arnold B. Silverman; Eckert Seamans Cherin & Mellott, LLC

[57] ABSTRACT

The present invention provides apparatus and associated methods for testing containers to determine if the containers have the desired fill point volume. In a preferred embodiment, the test container will be provided with fluid to the desired fill line and the volume of air in the container will be measured preferably by a differential pressure sensor in conjunction with a microprocessor with the corresponding volume of air in a reference container. The system provides suitable apparatus and an associated method for the supply of a fluid, which may be water, to the fill line in the container and the use of the distance between the fill line and container base or the distance between the fill line and the container mouth, or the percentage headspace in ascertaining the desired volume. In a preferred approach, after the fluid has been introduced into the test container to the desired fill line, comparative volume determinations will be made between the test container and a reference container employing differential pressure measuring. In an alternate embodiment, fluid is introduced into the test container, but not the reference container. In one embodiment, the height of the container measured between the container mouth and the container base is measured with the microprocessor making adjustments in desired fill line level if the height departs from the desired height.

36 Claims, 4 Drawing Sheets

METHOD AND APPARATUS FOR DETERMINING FILL LEVEL VOLUME OF AIR OF CONTAINERS

BACKGROUND OF THE INVENTION

1. Field of the Invention

The present invention relates to apparatus and associated methods for inspecting containers to determine the fill line volume of the container.

2. Description of the Prior Art

It has been known in connection with numerous containers to inspect the same for conformance to a wide variety of specifications including, for example, overall dimensions, wall thickness, symmetry, and container capacity. Such containers include rigid containers which may be made of glass, plastic, metal or combinations thereof, for example.

U.S. Pat. No. 4,899,573, owned by assignee of the present invention, discloses a system for inspecting containers for leak and volume by providing a test container and a standard container with pump means delivering to each container a pressure pulse through conduits which contain acoustical impedance means. The pressure differential between the two conduits measured between the standard container and the acoustical impedance in its portion of the conduit and the test container and its portion of the acoustical impedance material is then employed to determine volume differential between the container being tested and the standard container. The disclosure of this prior patent is incorporated herein by reference.

One of the important parameters measured in respect of such containers, particularly rigid containers, which are adapted to hold liquids or other flowable materials is fill point capacity in order to make sure that the containers will deliver the desired amount of the product and to provide a uniform appearance for a group of containers on the store shelf. Also, if the headspace is too small, high pressure can build up in the headspace as the product warms. This can result in container breakage.

One known prior art method for effecting this measurement is to achieve it gravimetrically. The empty container is weighed. The container is then filled to the specified point with water and the container is weighed again. Among the disadvantages of this approach are errors that can be made in measurement, variations in the water fill temperature, and errors in filling to the desired fill point, which errors may be equipment errors if semi-automatic or automatic fill point instruments are employed, or human, if an operator is required to judge the fill point. Also, errors can be made in making the required calculation. As a result, variations can occur with such a test resulting in departure from the desired fill point.

The fill point can be measured as (a) a specific distance from the base of the container, or (b) a specific distance down from the mouth of the container, or (c) on the basis of headspace.

In spite of the foregoing prior art, there remains a need for an efficient, reliable system for determining the volume of a container which will be occupied by a product if the product is provided to a level of a predetermined fill line.

SUMMARY OF THE INVENTION

The present invention has met the above-described needs.

The apparatus of the present invention in one embodiment includes providing first container supporting means for supporting a test container which is being tested and second container supporting means for supporting a reference or standard container. Fluid supply means, which may supply water, introduces a suitable fluid, such as water into the test container to the desired level. Fluid level sensor means deliver information to microprocessor means to confirm that the level of fluid is at the desired fill line, after which fluid supply is terminated. A volume determination of the air in the container with the fluid present is then made preferably employing volume determination means which contain differential pressure measuring means and may employ the invention of U.S. Pat. No. 4,899,573.

In one preferred embodiment, sensor means are provided for determining the height of the container measured from the base to the mouth and this information is delivered to the microprocessor to make sure that the height is as desired. This measurement would be employed where the volume would be measured from the base to the fill line. In an embodiment where the fill line is measured from the fill line to the mouth of the container, this height measurement need not be employed. In one embodiment, the standard container against which the test container will be measured will also be provided with a fluid, such as water, to the desired fill line, after which volume comparison between the air in the standard container and the air in the test container will be made. The fluid supply means will have first conduits connecting a fluid reservoir with the test container and second conduit means in communication with the air within the container for determining the air volume subsequent to establishing the desired fluid fill line within the container. Such a construction may similarly be employed with the reference standard container.

In another embodiment, a calibration test between a first reference container in the position of the test container having water to the fill line and a second reference container not having water is conducted. Later, this calibration is employed in testing a test container which has water as compared with a reference container without water.

The method of the present invention involves employing fluid level monitoring means to determine when fluid delivered to the container interior has reached the desired fill line and then terminating the supply of fluid to the test container and the standard container, after which the air volume in the test container is measured and compared in the microprocessor means with the air volume in the standard container.

It is an object of the present invention to provide apparatus and an associated method for accurately and reliably measuring the fill point volume of containers.

It is another object of the present invention to provide such a system which is adapted for automated measurement of such volumes in rigid containers.

It is a further object of the present invention to effect such measurements by initially employing a microprocessor to fill the container to a desired fill line with a suitable fluid, such as water, and subsequently measuring the volume of the air remaining in the container, i.e., the fill height volume.

It is another object of the pursuant invention to provide such a system which is employable with opaque, translucent and transparent containers.

It is a further object of the present invention to provide such a system for effecting such measurements in a rapid fashion.

These and other objects of the invention will be more fully understood from the following description of the invention on reference to the illustrations appended hereto.

DESCRIPTION OF THE PREFERRED EMBODIMENTS

Figure 1:
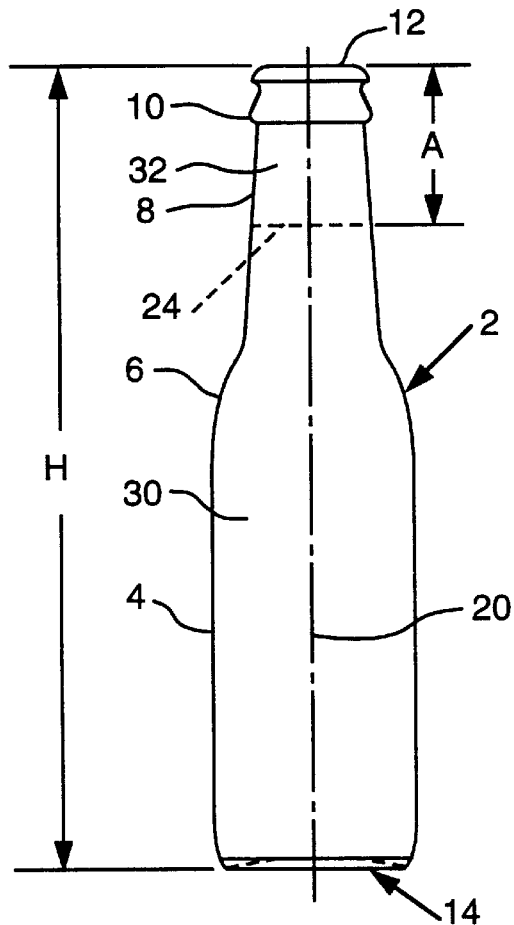
FIG. 1 is an elevational view of a necked-in rigid container of the sort employable with beverages.

With reference to FIG. 1, there is shown a container in the form of a necked-in rigid bottle 2, which may be made of glass or plastic, for example. The bottle has a cylindrical lower portion 4, a transition portion 6, a necked-in portion 8, and an annular outwardly projecting closure receiving portion 10. A mouth 12 is at the upper end and a base 14 at the lower end. The bottle is generally symmetrical both interiorly and exteriorly about a longitudinal axis 20.

The overall height H of the bottle 2 in terms of overall fill capacity extends from the lower or outer surface of base 14 to the mouth 12. Assuming that it is desired to fill the container 2 with a flowable product to fill line 24, which is a distance A from the mouth 12, one would have to determine that within specification limits the amount of flowable product that will be received within region 30 which comprises the interior volume of the container up to the fill line 24 will be consistent from container to container. The upper portion 32 of the interior of container 2 between fill line 24 and mouth 12 will generally be filled with air or other gases.

It is a prime objective of the system of the present invention to inspect containers to make sure that the volume of the region 30 to be filled with the product is within specifications.

Figure 2:
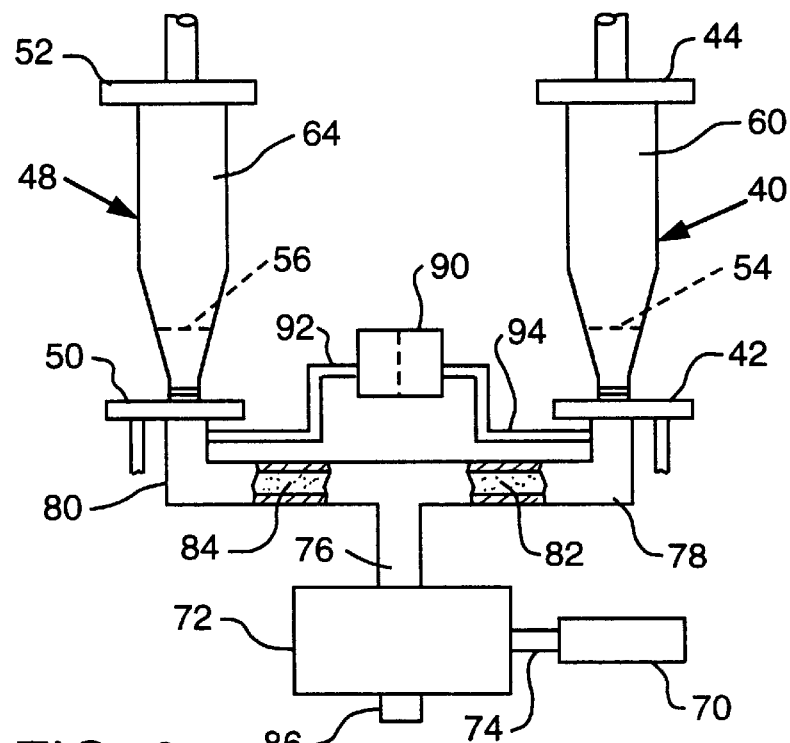
FIG. 2 is a schematic elevational view of a form of apparatus employable in the present invention.

Referring to FIG. 2, a general overview of the invention will be provided. A container to be inspected 40 which will be referred to herein as a "test container" is positioned in inverted position and is clamped between a support member 42 which will preferably have a sealing material on the upper surface thereof, such as a urethane sealing pad (not shown in this view) and an upper clamp member 44. Similarly, a reference or standard container 48 which is of the dimensions desired in the container is clamped between a base 50 and an upper clamping member 52. In lieu of using a reference container which is generally identical to the container being tested, a fixture having the desired interior volume may be employed, even though this is not the preferred approach. The volume may be variable, if desired. The terms "reference container" and "standard container" as employed herein shall be deemed to embrace such an apparatus also. Test container 40 has a fill line 54 and reference container 48 has a fill line 56. It will be appreciated that filling these containers 40, 48 in the lower portion with a fluid, such as water, up to lines 54, 56 will result in the air volume remaining in the overlying regions of the container interior 60, 62, respectively, representing the volume available for the product to be introduced into the container.

In another embodiment, water is introduced into the test container, but not the reference container. In this embodiment, the microprocessor is calibrated prior to testing by employing two reference containers of known volume. The one in the test container position receives water to the fill line and the other does not. The reading of the container in the test position is compensated for by adjusting for the presence of the water. This may be done by subtracting the volume of water to the measure volume difference between the test container and the reference container. For example, if the reference container in the test container position had one ounce of water and the other reference container had none, the microprocessor would subtract the volume of the one ounce of water from the measured volume difference between a test container having one ounce of water and the reference container.

Referring still to FIG. 2, after it has been confirmed that a fluid, such as water, has been introduced into test container 40 to the desired fill line 54, the flow of fluid into container 40 will be terminated and the second stage of the operation of the system will be initiated to determine the volume of region 60 as compared with the volume of region 64. In the preferred form, which is that illustrated, the system of U.S. Pat. No. 4,899,573 will be employed, although other volume determining means could be used if desired. Referring to the volume determining portion which will be explained in greater detail hereinafter, a stepper motor 70 is connected with an air pump 72 by a shaft 74. The output end of the pump 72 is in communication with an outlet conduit 76 which is in further communication with a first conduit branch 78 which communicates with the interior of test container 40 and a conduit branch 80 which is in communication with the interior 64 of the reference container 48. An acoustic impedance means 82, 84 is positioned within the respective branches 78, 80. A suitable material for use as the acoustic impedance means are bonded spherical beads having a network of interstitial pores of generally uniform size. The pump 72 has a small opening at 86 which is open to the atmosphere and functions as a vent to make the system relatively insensitive to long-term (on the order of tenths of seconds or longer) ambient pressure changes. A differential pressure measuring means 90, which may take the form of a pressure transducer, is in communication through conduit 92 with conduit branch 80 and through conduit 94 with conduit branch 78. The output of the differential pressure measuring means 90 is delivered to a microprocessor in the manner disclosed in U.S. Pat. No. 4,899,573, the disclosure of which is expressly incorporated herein by reference.

In operation of this segment of the system in effecting a comparison between volume 60 and volume 64 of the respective test container 40 and standard container 48, the pump 72 provides a pressure pulse to both containers 40 and 48 with the pressure differential being monitored at 90 and delivered to the microprocessor means. The microprocessor means then determines whether the test container 60 has the desired volume in the region between the fill line and the container base. It will be appreciated that prior U.S Pat. No. 4,899,573 focused upon measuring the entire container volume. In the present invention, as a result of the presence of water or other suitable fluid which will not be compressed by the pressure pulse the system determines a volume measurement of the desired region 60.

Figure 3:
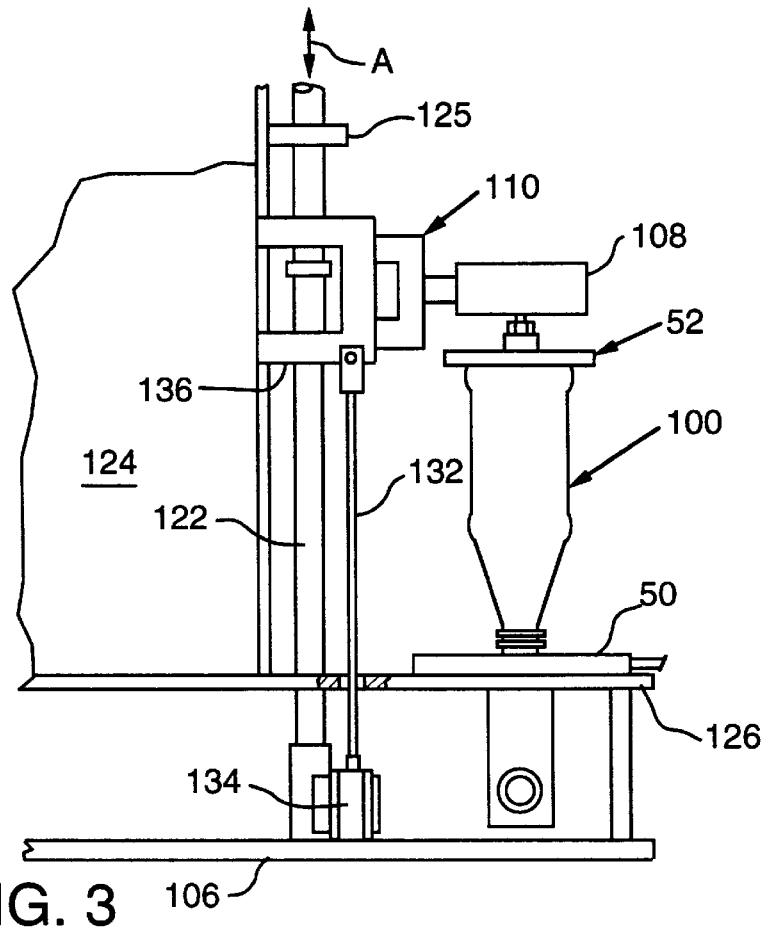
FIG. 3 is a schematic elevational view illustrating a container and associated retention and sensing means in one embodiment of the invention.

Referring to FIG. 3, a system for monitoring the overall height of the container 100 will be considered. The inverted container 100 is clamped between support 50 and support 52 which, as a result of arm 108, is secured to clamp 110 which, in turn, is secured to post 122 which is supported within bushings in support 125 and in base plate 126. Locking means to be described hereinafter, operatively associated with post 122, may be employed to lock the clamp 110 in position once the bottle 100 is sealed against lower support 50 which has a resilient upper surface. Post 122 moves in the directions shown by arrow A. A cable 132 is operatively associated with a resistive sensor 134, which is secured to base 106, serves to provide an electrical output which varies in accordance with the vertical position of the clamp 110. The cable is secured to the lower leg 136. This electrical output signal will be provided to the microprocessor means (not shown in this view) so that departures from the overall container height may be employed to correct for fill line position. The resistive sensor measures the overall height H of the bottle (FIG. 1). The microprocessor will determine the water height at the fill line by subtracting the stored value of fill height from the measured height H. In lieu of the resistive sensor with the cable arrangement, other means will be readily known to those skilled in the art for monitoring changes in overall height from test container to test container, such as a linear encoder, a rotary encoder attached to the base of the instrument with the cable attached to the clamp and the cable passing over a pulley on the encoder. The container 100 may be clamped between clamping members 50, 52 with a force of about 50 pounds.

Figure 4:
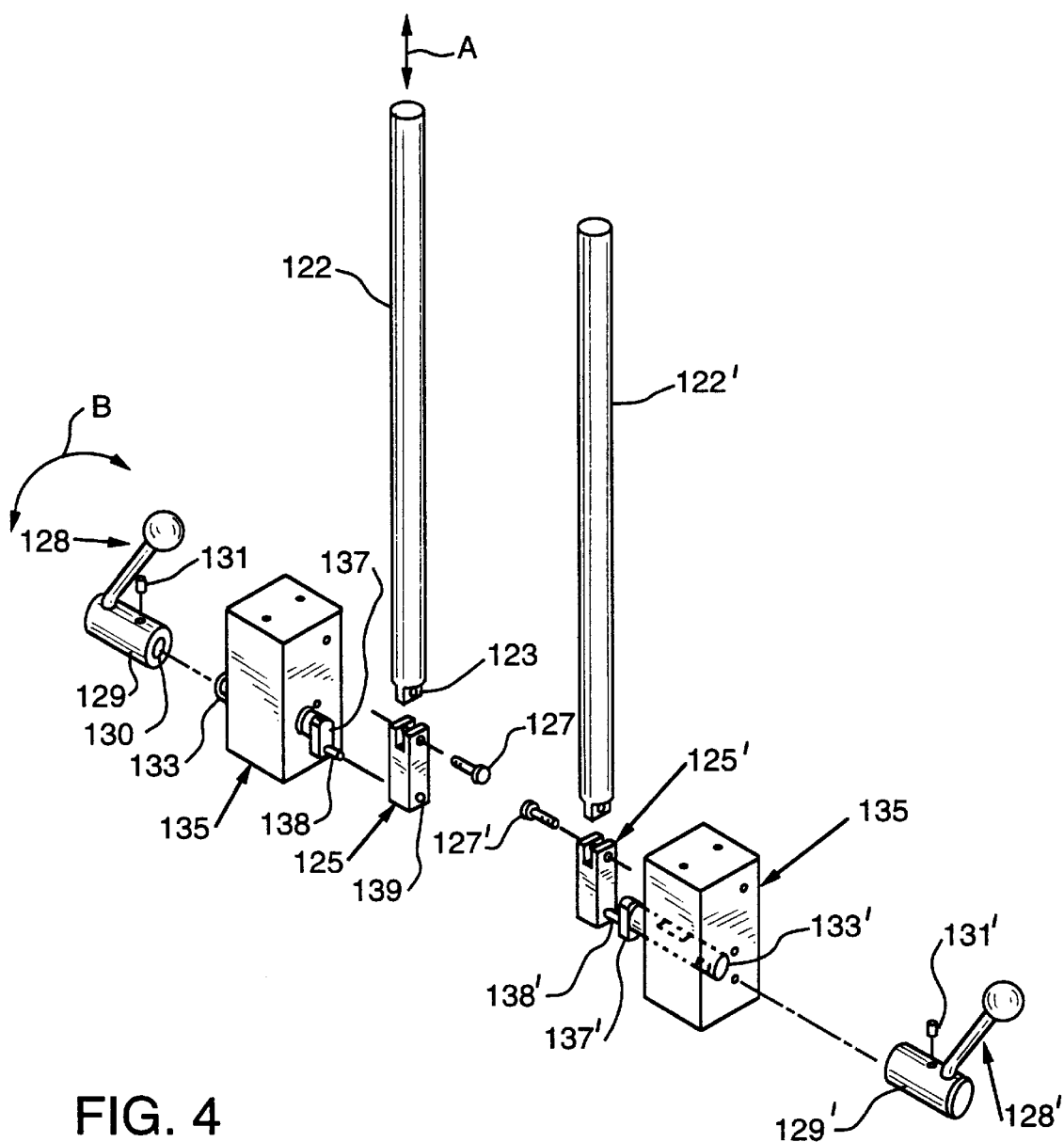
FIG. 4 is a schematic illustration of a form of fluid handling system of the present invention.

In effecting clamping on a container, as shown in FIG. 4, post 122 has its lower end 123 rotatably secured to block 125 by pin 127. Operating handle 128 has a tubular portion 129 which receives shaft 133 and is secured thereto by threaded fastener 131. Shaft 133 is rotatably received within block 135 and has an eccentric 137 with a projecting pin 138 extending into a bore 139 in block 125. As a result, rotation of operating handle 128 about the axis of tubular portion 129 in one of the directions indicated by arrow B will effect responsive movement of post 122 in the directions indicated by arrow A. In effecting clamping of a container, block 125 will be rotated until over center locking is effected. Rotation in the opposite direction will effect upward movement of post 122. Prime numbers have been employed to show the locking means for the other clamping station.

Figure 5:
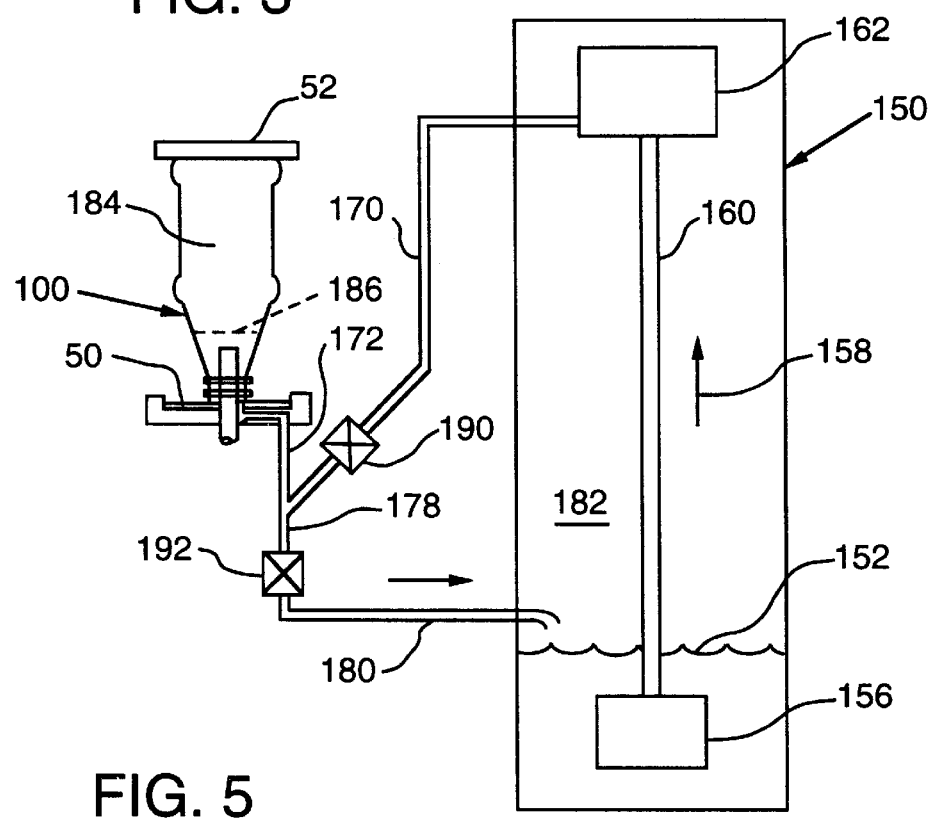
FIG. 5 is a detailed cross-sectional illustration showing a lower portion of the container and associated apparatus.
Figure 6:
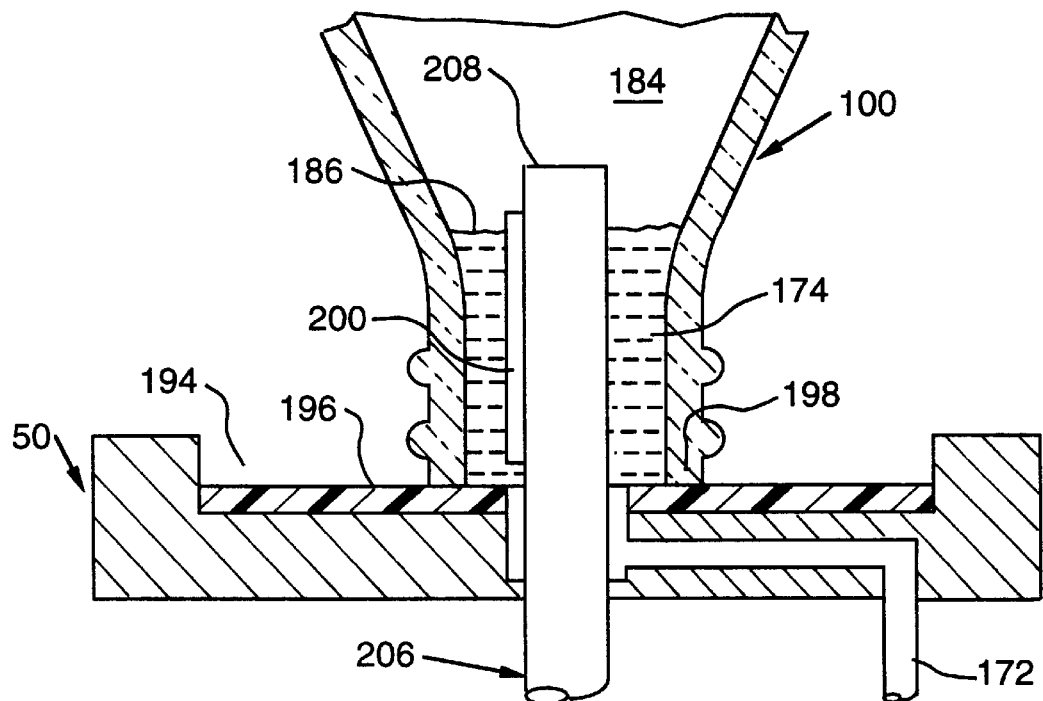
FIG. 6 is an exploded perspective view of a portion of the clamp assembly of FIGS. 2 and 3.

Referring to FIGS. 5 and 6, a more detailed disclosure of the handling of the water or other fluid, which will be delivered to the container interior, will be considered. As shown in FIG. 5, a water reservoir 150 contains water to a level 152 with a submersible pump 156 pumping water in the direction indicated by arrow 158 through conduit 160 to upper reservoir 162 which is preferably maintained full in order to provide a constant pressure at its outlet. Outlet conduit 170 delivers water to conduit 172 which, as shown in FIG. 6, is in communication with container interior 174. Drainage of water out of the container is effected through conduit 172 to drain lines 178, 180, which is in communication with the interior 182 of the reservoir. The microprocessor (not shown in this view) will control operation of valves 190, 192 which are located respectively in conduits 170, 180 in order to control delivery of water to the container 100 and return of water to the reservoir 150 therefrom. The valves 190, 192 are preferably solenoid valves which are suitably connected by electrical wires to the microprocessor means.

In the cycle of operation, the container 100 is positioned and clamped in sealing relationship between clamps 50, 52. Pump 156 is energized by the microprocessor to cause water to flow through conduit 160, reservoir 162, and conduit 170, with solenoid valve 190 in the open position (and valve 192 closed) into conduit 172 and ultimately into region 174 (FIG. 5) of container 100. This flow will continue until the desired fill line 186 has been reached, after which operation of the pump 156 will be terminated and valve 190 closed. The volume of air in the portion 184 of the container interior disposed above the fill line 186 (the "fill height volume") will then be determined and compared with the volume in the reference or standard container. After air volume testing has been completed drain valve 192 is opened and water flows under the influence of gravity from the interior 174 of container 100 through conduit 172 and conduit 180 and into the interior of reservoir 150.

If desired, the same cycle of operation may be employed with respect to the standard container so that both containers will have water or other fluid at the desired fill line level in order to facilitate subsequent volume determination and comparison. In the alternative, water may be employed solely in the test container and an appropriate adjustment for the absence of water in the reference container may be made.

Referring once again to FIG. 6, additional features of the invention will be considered. It will be noted that the lower clamp element 50 is generally cup-shaped and has an upwardly open recess 194 within which a resiliently compressible sealing material, such as a urethane 196, is positioned such that the lowermost annular end of the container at the container mouth 198 may be sealingly engaged with the sealing material 196 to thereby resist leakage of water out of the container 100.

A water level sensor 200 determines the level of water within the container neck 174 and delivers a signal to the microprocessor such that the microprocessor can determine when the desired fill level 186 has been reached and terminate delivery of water to the container 100. It will be noted that the sensor 200 is sufficiently small as to be received within the neck of container 100. A suitable type of sensor for this purpose, is a capacitive sensor which is comprised of two electrically conductive plates, insulated from each other and from the water in container 100. A voltage may be impressed between the two conductive plates. The electrical capacitance between the two plates with the water acting as a part of the dielectric material between the plates can be sensed by any one of a number of means well known to those skilled in the art.

A riser tube 206 has its free end opening 208 disposed above the fill line 186 so that no water will flow into the tube 206. This tube 206 corresponds generally to conduits 78 and 80 of FIG. 2. In this manner, after delivery of the water has been completed, the volume within space 184 of container 100 is determined in the manner described in connection with FIG. 2. It will be appreciated that the description with respect to FIGS. 5 and 6 relates to the use of an air volume measurement of the space enclosed by the walls and base of the container and the water surface at fill line 186. In the event that one were to employ the distance between the container mouth and the fill line, the clamp position sensor, as described in connection with FIG. 3, may be ignored and the supply of water may be terminated when the water level sensor reaching the fill line 186 without paying attention to the clamp readings.

Another approach to determining the desired water level may be through determination of the percentage of headspace. The headspace is generally referred to as the space within the interior of the container above the contents of the container. Determining the percentage of the container interior which is the headspace is accomplished by multiplying 100 by the total volume of the container interior, generally referred to as "overflow volume", less the fill point volume which would be the volume of the container in FIG. 6 filled by water up to the level 186, divided by the total volume of the container or overflow volume. As the system of volume determination described in U.S. Pat. No. 4,899,573 and disclosed in connection with FIG. 2 can measure both the overflow volume and the fill point volume, the microprocessor can readily determine the percentage headspace.

Figure 7:
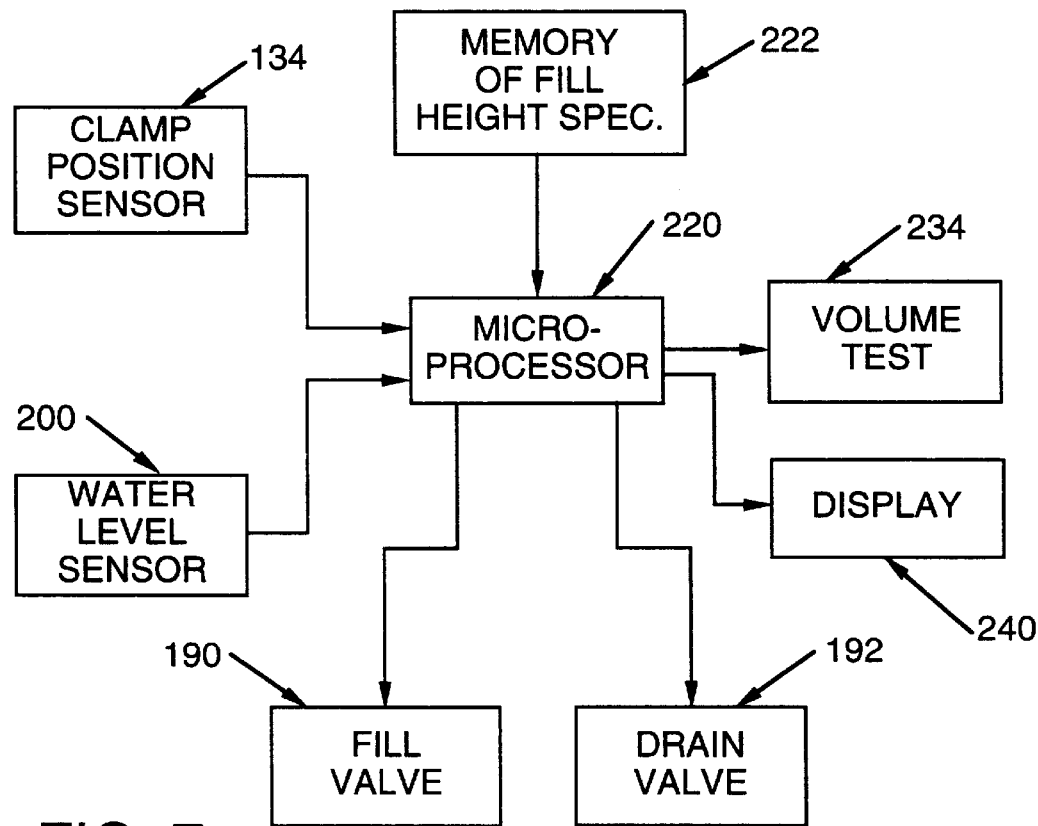
FIG. 7 is a schematic illustration of the microprocessor and associated portions of the functioning of the same.

Turning to FIG. 7, microprocessor 220, receives information from the water level sensor 200 and the position of clamp position sensor 134 (FIG. 3) which senses overall container height. Also delivered to the microprocessor 220 and stored within its memory are the fill height specifications 222 which state specified fill line 186 information and variations therein. The microprocessor 220 emits a signal to fill valve 190 to initiate flow of water to the interior of container 100 until such time as the sensor 200 determines that the desired level has been achieved at which point fill valve 190 is closed and the supply of water is terminated. At that point the microprocessor 220 emits a signal to the system for determining volume 234 to initiate the volume test after which the volume test is terminated and the microprocessor 220 emits a signal to open valve 192 to thereby permit the container to drain such that the test container 100 may be manually unclamped and removed from the test station and another container positioned at the test station to thereby facilitate the repeat of the cycle with a new test container. The air volume or other stored, measured, or calculated data may be stored, printed out in hard copy or shown on display 240, such as a computer monitor, for example.

It will be appreciated that the present invention may be employed with a wide variety of containers made from materials such as glass, plastic and metal or combination thereof.

It will be appreciated that the method of the present invention in a preferred embodiment involves determining the fill point volume which is the volume of the container available for the product if filled to the fill line. First and second container supporting means for supporting a test container are provided with the container preferably inverted and sealingly engaged with the lower clamped member. Fluid is supplied to the container interior until the fill line has been reached. After the fill line has been reached the supply of fluid to the container is terminated. The air volume within the test container is determined after which the fluid within the test container is drained and the container is removed from the test station. A preferred method of determining the volume differential between the two containers employs differential pressure measuring means. The microprocessor serves to control the delivery of fluids, such as water, to the container interior, determines when the fill line has been reached and coordinates the draining of the fluid from the container. Subsequently, the operator unclamps the test container and removes it to be replaced by another test container.

EXAMPLE

An example of the present system involves testing of the volume in a necked-in container which has an overall height of 6 inches, a threaded mouth to which a threaded closure may be secured, a nominal diameter in its "lower" portion of 2½ inches, and an average diameter in its necked-in portion of 1 inch. The test container has a fill height specified to be 5.4 inches above the base. It is inverted and clamped in the right side of the machine. Another container of the same nominal size and shape is inverted and placed on the left side of the machine. Water is introduced into the test container. The test container has a nominal height of 6 inches, but in this specific example, has an actual height of 6.05 inches. Water is introduced to a depth of (6.05−5.4=) 0.65 inches.

After this has been accomplished, the test container air volume is measured and compared with air volume in the reference. The machine compensates for the fact that water is not present on the reference container side and reports the compensation volume difference. The operator records the volume difference and whether the test container meets the applicable specifications.

We claim:

1. Apparatus for determining fill height volume of air in a container comprising first container supporting means for supporting a test container, second container supporting means for supporting a reference container, liquid supply means for introducing liquid into said test container and withdrawing liquid from said test container, liquid level sensor means for monitoring the liquid in said test container, microprocessor means for terminating supply of said liquid when said liquid level in said test container reaches a predetermined level, and volume determining means for determining the fill height volume of air within said test container.

2. The apparatus of claim 1 including
   said volume determining means having differential pressure means.

3. The apparatus of claim 2 including
   said first container support means and said second container support means each including means for supporting said containers in inverted positions with the container mouths facing generally downwardly.

4. The apparatus of claim 3 including
   said first and second container support means each having a base portion for sealingly engaging said container mouths and upper clamp means for engaging the bases of said containers, and
   measuring means for determining the distance between said container bases and said container mouths.

5. The apparatus of claim 2 including
   said liquid supply means having means to supply water as said liquid.

6. The apparatus of claim 5 including
   said liquid level sensor means having a first water level sensor extending into said test container and delivering first liquid level signals to said microprocessor means.

7. The apparatus of claim 6 including
   said microprocessor means having means for determining the level of water in said test container and terminating water supply to said test container by said liquid supply means when a predetermined level of water is present in said test container.

8. The apparatus of claim 7 including
   said liquid level sensor means having a second water level sensor extending into said reference container and delivering second liquid level signals to said microprocessor.

9. The apparatus of claim 4 including
   said first and second container support means each having means for providing container height signals to said microprocessor means, and
   said microprocessor means having means for adjusting said liquid supply to said test container if said test container departs from predetermined height.

10. The apparatus of claim 1 including
said container having a container base and a container mouth,
said microprocessor means having means for determining fill height volume by employing distance from the container base, distance from the container mouth or percent headspace.

11. The apparatus of claim 9 including
said liquid supply means being water supply means having water reservoir means, water pump means associated with said water reservoir means for delivering water to said test container, first conduit means for delivering water from said reservoir means to said test container and for delivering water from said test container to said reservoir, valve means operatively associated with said conduit means for permitting or restricting water flow within said conduit means.

12. The apparatus of claim 11 including
said liquid supply means including second conduit means and second valve means for delivering and returning water from said reference container.

13. The apparatus of claim 11 including
said microprocessor means having means to control operation of said water pump means and said valve means.

14. The apparatus of claim 1 including
said volume determining means having
(a) air pump means for applying a pressure pulse to the interior of said test container and the interior of said reference container,
(b) first air conduit means for connecting said air pump means with said test container,
(c) second air conduit means for connecting said air pump means with said reference container,
(d) acoustic impedance means for facilitating obtaining a pressure differential between said reference container and said test container interposed between said air pump means and said test container and between said air pump means and said reference container, and
(e) differential pressure measuring means operatively associated with said test container and with said reference container for monitoring pressure differential between said test container and said reference container and emitting a signal corresponding to said pressure differential to said microprocessor means.

15. The apparatus of claim 2 including
said liquid supply means not having means for delivering liquid into said reference container.

16. The apparatus of claim 15 including
said microprocessor means having means for adjusting for the absence of said liquid in said reference container in determining said fill height volume of said test container.

17. The apparatus of claim 16 including
said apparatus being structured to inspect glass test containers.

18. The apparatus of claim 1 including
said liquid level sensor means having a portion receivable within said test container.

19. The apparatus of claim 1 including
said volume determining means having a tube extending into said test container to a height greater than the surface of said liquid.

20. A method of determining the fill height volume of air in a container comprising providing first container supporting means supporting a test container and second container supporting means supporting a reference container,
introducing liquid into said test container and monitoring the liquid level in said test container,
terminating supply of said liquid when the liquid level in said test container reaches a predetermined level, and
subsequently taking and comparing volume measurements between said test container and said reference container to determine the fill height volume of air within said test container.

21. The method of claim 20 including
employing differential pressure measurement in effecting said volume measurements.

22. The method of claim 21 including
supporting said test container and said reference container in inverted position with the container mouths facing generally downwardly.

23. The method of claim 22 including
employing said method on rigid containers.

24. The method of claim 22 including
employing said method on containers made of at least one material selected from the group consisting of glass, plastic and metal.

25. The method of claim 21 including
measuring the height of said test container from the test container mouth to the test container base and providing responsive signals to microprocessor means, and
employing said microprocessor means to determine the overall height of said test container from said signals.

26. The method of claim 25 including
employing water as said liquid.

27. The method of claim 26 including
supplying said water into said reference container and delivering signals to said microprocessor indicating the water level in said reference container.

28. The method of claim 27 including
employing water level sensors to sense the amount of water within said test container and said reference container.

29. The method of claim 28 including
employing conduit means for delivering water to said test container and said reference container and sealingly securing the mouths of each of said first and second containers to an underlying support, respectively, of said first container supporting means and said second container supporting means.

30. The method of claim 23 including
determining a fill line in said test container by the distance of the liquid level in said test container from the base of said test container.

31. The method of claim 22 including
determining a fill line of said test container by determining the distance of the liquid level from the mouth of said test container.

32. The method of claim 22 including
determining a fill line of said test container by the headspace.

33. The method of claim 25 including
employing volume determining means which has a pump in communication with both the test container and the reference container through air conduit means which contain acoustical impedance means,
providing a pressure pulse to both said test container and said reference container, monitoring the pressure differential between two locations, one of which locations is disposed between said reference container and said acoustical impedance means and the other of which locations is disposed between said test container and said acoustical impedance means, and employing said pressure differential to determine if the test container has the desired fill height volume.

34. The method of claim 33 including delivering signals containing information regarding said pressure differential to said microprocessor means, and employing said microprocessor means to determine if said test container has the desired fill volume height.

35. The method of claim 29 including introducing said conduit means respectively into said test container and said reference container such that free ends of said conduit means are above the fill line of said water.

36. The method of claim 21 including providing said liquid to said test container but not to said reference container, and in determining said fill height volume of said test container adjusting for the absence of said liquid in said reference container.

* * * * *